United States Patent [19]

Vierstraete

[11] 4,165,948
[45] Aug. 28, 1979

[54] DRILLING AND BORING MACHINE

[76] Inventor: Irene Vierstraete, 83 rue Victor-Hugo, Oignes, France

[21] Appl. No.: 845,827

[22] Filed: Oct. 26, 1977

[30] Foreign Application Priority Data

Oct. 29, 1976 [FR] France .................... 76 33340

[51] Int. Cl.² .............. B23B 39/18; B23B 47/22
[52] U.S. Cl. ...................... 408/46; 408/50; 408/52; 408/53; 408/70; 408/88; 408/100; 408/235
[58] Field of Search ............ 408/234, 235, 42, 46, 408/49, 52, 53, 69, 70, 88, 99–102, 50, 235

[56] References Cited

U.S. PATENT DOCUMENTS

| 2,374,874 | 5/1945 | McKee | 408/88 |
| 2,974,548 | 3/1961 | Miller | 408/46 |
| 3,836,276 | 9/1974 | Cloup | 408/69 |
| 3,945,750 | 3/1976 | Malot | 408/234 |

Primary Examiner—Leonidas Vlachos
Attorney, Agent, or Firm—Kemon & Estabrook

[57] ABSTRACT

The invention relates to a machine for drilling and boring tubular plates, the workpiece-carrying elevator being embedded, weight compensation being provided by appropriate means, the machining units moving substantially at ground level opposite thrust tubes bearing on the plate before each machining cycle and absorbing tool thrusts. The machine is characterized by an elevator which supports the plate for machining and which moves on slideways with balancing by hydraulic rams in a constant proportion to the weight of the workpiece being machined. Thrust means retain the thrusts of the spindles, the movements of the latter spindles and means being synchronized by means, the tilting torque produced by the thrust of the spindles is limited by the provision at ground level of a closed framing which interconnects all the constituent elements. The invention is of use for drilling and boring any article, more particularly for the baffle plates of heat exchangers, boilers, water purifiers, heaters and the like.

36 Claims, 3 Drawing Figures

DRILLING AND BORING MACHINE

This invention relates to a machine for drilling and boring articles, more particularly the tube plates and baffles of heat exchangers, boilers, water purifiers, heaters and the like.

The conventional practice in existing machines is to provide used or new drilling machines with a single boring head whose axial position is fixed on moving parts X, Y of the associated machine.

The disadvantages arising from this system are familiar. Only a single head can operate at a time. Machines for dealing with large metal articles have to be very large and must be very heavy to withstand the tilting torque resulting from tool pressure several meters above the bearing positions and slideways. Similar considerations apply to the horizontal and vertical workpiece-supporting plates and to the reinforced concrete mass serving to stiffen the complete system.

These moving weights are so considerable that speed must be very low, so that output is low.

It is an object of this invention to obviate these disadvantages. The machine can have a number of heads; the weights referred to are reduced considerably since the overturning torque arising from the thrust of the heads is applied very near the bearing positions, and the moving masses are reduced considerably, with the result that the moving members can move such faster than has previously been possible.

The machine according to the invention comprises a frame carrying one or more machining heads, the between-axis separation of the heads being adjustable, each head being disposed opposite an embedded workpiece elevator whose vertically moving mobile element has its weight compensated for by a balancing facility.

Behind the elevator slideways a horizontal slider is secured thereto and receives at least one thrust-countering device for withstanding pressures applied to the plate by the or each boring and drilling tool, the thrust-countering device or means being movable horizontally and parallel to the spindle simultaneously therewith through the agency of synchronizing means. The system embodied by the spindles and the thrust-countering means is substantially at ground level. A closed-frame structure provides a mechanical connection between the various elements of the system at ground level.

The following description is of a non-limitative and preferred embodiment of the machine according to the invention, the machine being shown in the accompanying drawings wherein.

Figure 1:
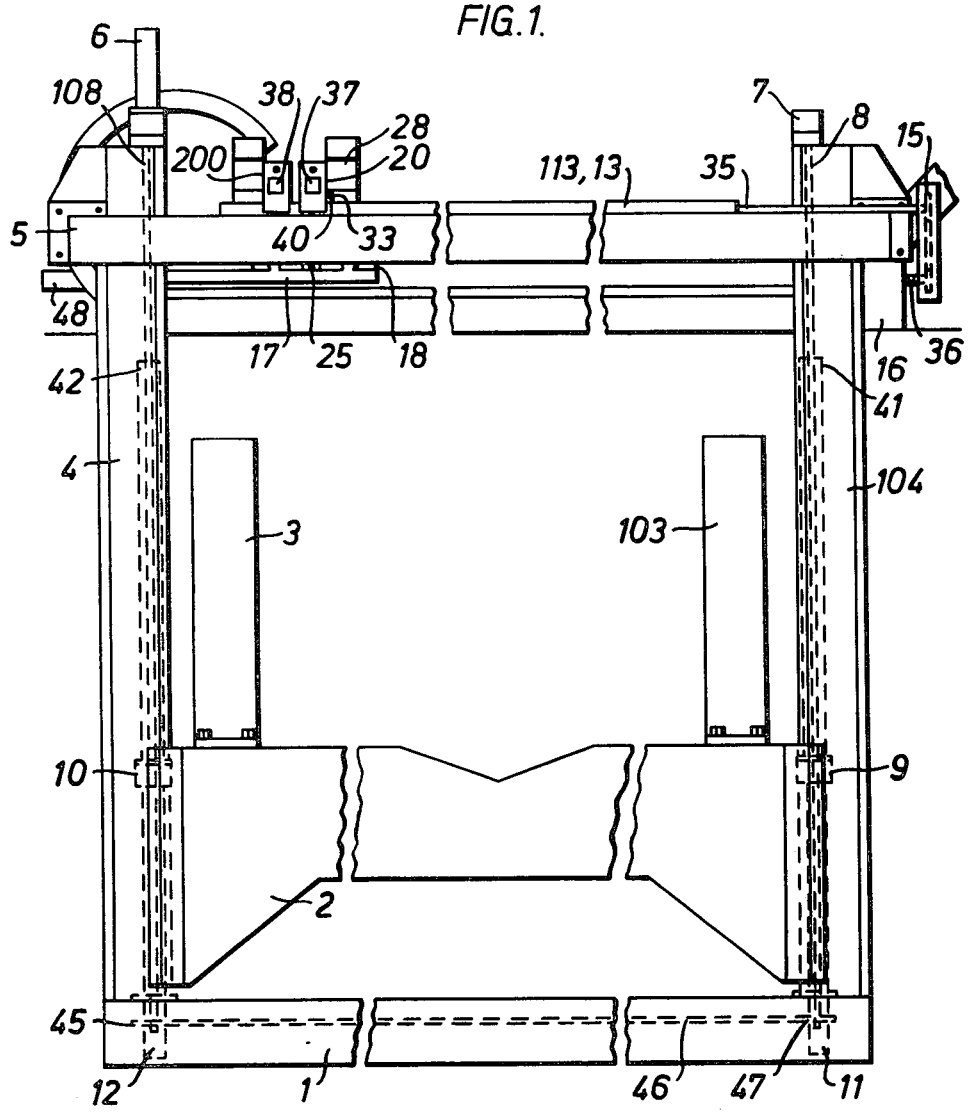
FIG. 1 is a view in rear elevation of the complete machine without any plate to be machined and without cable carrier.
Figure 2:
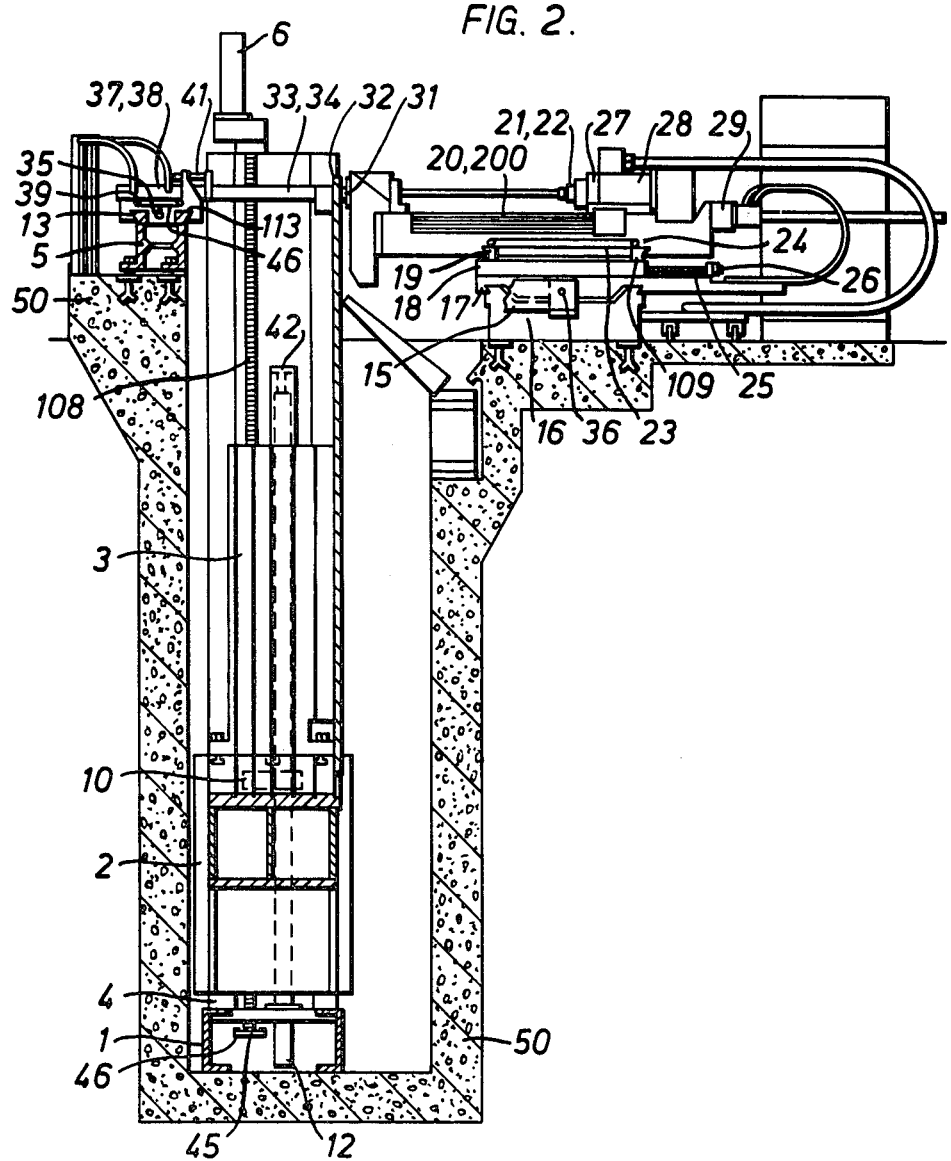
FIG. 2 is a side view of the machine and a section through the elevator of its vertical axis.
Figure 3:
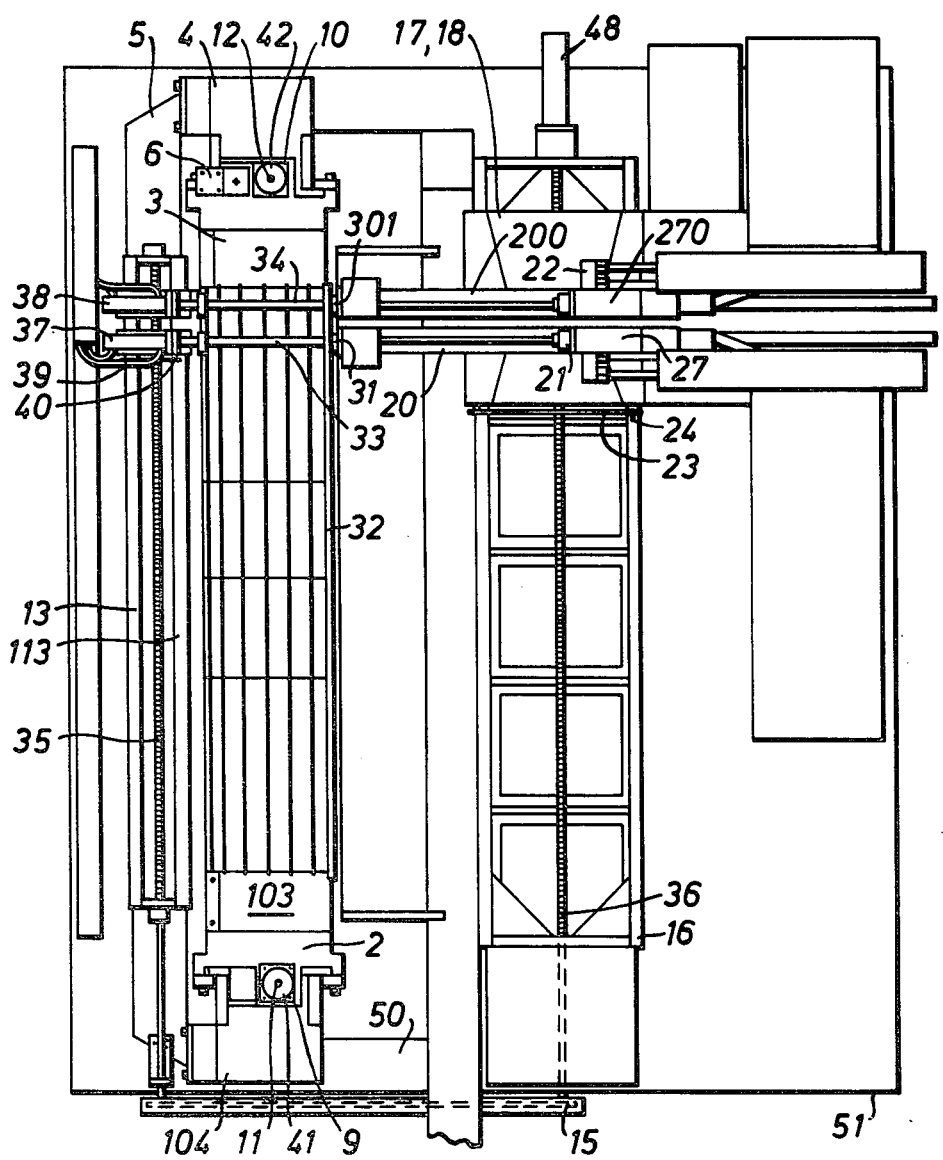
FIG. 3 is a plan view of the complete machine.

A bed 16 receives a cross-slide 17, 18 on which boring and drilling units 20, 200 are disposed at an adjustable between-axis distance. The drilling unit 20 is secured to the side surface; the unit 200 is mobile and is moved on slideways 19, 109 through the agency of two screws synchronized by a chain 23 driven by a hexagon 24. Adjustment of the distance between the spindles and the workpiece is by means of a screw 25 driven by a hexagon 26 which can move the system of spindle supports 20, 200 towards and away from the slide 18.

Each spindle is rotated by a hydraulic motor 28 and each advance is produced by means of a hydraulic motor and reduction unit 29 acting by way of a nut rotating on an endless screw rigidly secured to a spindle slide 27, 270 respectively; rotation to one hand advances the latter slide and rotation to the other hand moves the slide backwards.

Movements of the chip box are controlled by a hydraulic ram (not shown) enabling guns 31, 301 to bear on the number 32.

Thrust tubes 33, 34 are disposed opposite the spindles 21, 22 and are moved together therewith through the agency of screws 35, 36 whose movements are synchronized by a transmission comprising a chain and sprockets 15 driven by the screw 36 rotating the motor and reduction unit 48.

As in the case of the spindles, the distance between the axes of the actuators 37 and 38 is adjustable by two endless screws synchronized by a chain and sprockets 40 and driven by a hexagon 39. The actuator 37 is secured to the lateral surface in constant alignment with the spindle 21 while the actuator 38 is mobile so that it can be adapted to the alignment of the spindle 22.

The hydraulic equipment of the actuators is adapted to operate in two ways depending on the thickness and rigidity of the workpiece:

(1) Each actuator spindle can be advanced at a reduced pressure until the thrust tube bears on the workpiece 32. After a time determined by a delay relay, the 3-position hydraulic distributor ceases to be energized and the oil present at the bottom of the actuator is retained by a pilot check valve which prevents any return of the actuator. The spindle can then come into operation since the thrust of the tool on the workpiece does not cause the thrust tube carried by the actuator to move back. Upon completion of the cycle of drilling operations the actuator is moved back by operation of the hydraulic distributor, and the two moving elments—i.e., the actuators and the machining heads —can move in synchronism to perform the next cycle. (2) Each ram or actuator has an end stop device 41 in the form of a screw and two locknuts, and can therefore be adjusted accurately so that each thrust tube is just in contact with the workpiece. The pressure on each actuator is adjusted to exceed the maximum thrust of the tools. Thrust tubes of different lengths are used in accordance with the thickness of the workpiece and each tube and bearing on the workpiece is relieved at the bottom so that the injected liquid can pass through at the end of the drilling movement.

The workpiece elevator takes the form of a soleplate 1, bearing on which are two uprights and symmetrical slides 4, 104 interconnected by cross-member 5 carrying the slideways 13, 113 on which the actuators 37, 38 move.

The slide 2 guided by the uprights 4, 104 is balanced vertically by two hydraulic rams 11, 12 bearing on the soleplate 1 and on the ends of the tubes 41, 42 rigidly secured to the slider 2 by way of lugs 9, 10 thereof. The pressure injected into the two actuators 11, 12 is adjusted by an electrical pressure reducer in relation to the weight of the work plus the weight of the slider 2 and of the side supports 3, 103 and to maintain a constant downwards thrust of e.g. 1 tonne on the screws 8, 108.

In the process of being machined the workpiece becomes lighter in weight; consequently, the pressure operative in the actuators must be corrected so that the thrust remains constant at 1 tonne. Accordingly, the absorbed power (or torque) of the motor 6 is detected by an electrical reference-value controller (known process) which outputs an electrical signal of a value proportional to the torque detected; consequently, the electrically operated pressure reducer previously referred to can be controlled and an even pressure of 1 tonne can be maintained on the screws, so that a constant torque is applied to the motor and reduction unit 6 acting on the screw 108 extending through the nuts rigidly secured to the lug 10 to engage with a sprocket 45 driving a chain 46 and a sprocket 47 secured to the screw 8 extending through the nuts rigidly secured to the lug 9 and bearing on the abutment 7. The two screws are therefore synchronized and enable the slider 2 to move perpendicularly relatively to the uprights 4 and 104.

The connection of the complete system is kept rigid by a reinforced concrete member 50 whose periphery is determined by a line 51. The drilling forces are therefore taken up by a closed rectangular frame, thus ensuring complete rigidity and reducing the weight required to withstand a given force.

The machine according to the invention is of use for drilling and boring articles of any kind, more particularly tube plates and baffles of heat exchangers, boilers, water purifiers, heaters and the like.

I claim:

1. Apparatus for machining a workpiece more particularly for drilling and boring plates or baffles for heat exchangers comprising:
    a machine foundation in the form of a closed framework,
    elevator means carried by the framework for supporting a workpiece in a vertically extending position,
    means for effecting movement of said elevator means to move the workpiece in a vertical direction,
    at least one tool carrier and at least one thrust member carried by the framework, said carrier and thrust member being disposed opposite to one another so as to be one on either side of a workpiece positioned therebetween,
    drive means for the tool carrier for effecting movement of the tool carrier in a direction towards the workpiece to effect a machining operation and in the opposite direction to withdraw the tool carrier, and
    locking means for holding the thrust member in contact with the workpiece to support the same against the thrust of the tool during a machining operation.

2. Apparatus as claimed in claim 1, wherein the machine foundation is a rigid structure comprising a vertically extending portion of channel section and two horizontally disposed portions one at each side of the open side of the channel and projecting outwardly therefrom, the elevator means being disposed in the channel, the tool carrier and thrust member being mounted on a respective one of the horizontally disposed portions.

3. Apparatus as claimed in claim 1, wherein a plurality of tool carriers are provided arranged side by side in spaced relationship, a corresponding number of thrust members also being provided and arranged side by side in spaced relationship, means for moving the tool carriers towards and away from each other to adjust the spacing between adjacent tool carriers and means for moving the thrust members towards and away from each other to adjust the spacing between adjacent thrust members.

4. Apparatus as claimed in claim 1, wherein each thrust member comprises a tube, a hydraulic ram connected to each said tube and means for supplying hydraulic liquid to each said hydraulic ram to move the thrust tubes into engagement with a workpiece.

5. Apparatus as claimed in claim 4 including means for hydraulically locking each ram to hold each thrust tube in contact with a workpiece.

6. Apparatus as claimed in claim 1, wherein the elevator means comprises vertically extending slides, a workpiece supporting platform carried by said slides so as to be vertically movable along the slides, means operable to effect the vertical movement of the platform said means comprising screw and nut mechanisms consisting of rotatably mounted vertically extending screws each carrying a nut secured to the platform, and drive means for effecting rotation of each screw, said drive means comprising an electric motor and reduction gear.

7. Apparatus as claimed in claim 6 including means for providing a constant load on the elevator operating means to compensate for change of weight of the workpiece resulting from machining operations.

8. Apparatus as claimed in claim 7, wherein said compensating means comprise hydraulic actuators controlled by a hydraulic pressure controller which is in turn controlled electrically by a torque detector detecting the electric motor and reduction gear unit producing the vertical movement of the elevator, such detector outputting an electrical signal proportional to the torque to the controller so as to ensure that a constant load is applied to the elevator operating means.

9. Apparatus as claimed in claim 8, wherein the hydraulic actuators comprise hydraulic rams extending vertically parallel to the platform slides each said ram being fixed at its lower end and extending into a respective tube carried by the platform the upper end of each ram abutting the upper closed end of its respective tube.

10. Apparatus as claimed in claim 6, wherein the screws of the screw and nut mechanisms are jointly rotated in synchronism by a chain drive one of said screws being connected to so as to be driven by the motor and reduction gear.

11. Apparatus as claimed in claim 1, wherein the movements of the thrust members relatively to the tool carriers are synchronized by two screws interconnected by an endless chain running over two sprockets one for each screw and respectively driving a set of nuts rigidly secured to each movable member.

12. Apparatus as claimed in claim 1, wherein the machine foundation is made of reinforced concrete the channel section portion extending below ground level the outwardly extending portions being disposed at or substantially at ground level.

13. Apparatus for machining a workpiece more particularly for drilling and boring plates or baffles for heat exchangers comprising:
    a machine foundation in the form of a closed framework,
    elevator means carried by the framework for supporting a workpiece in a vertically extending position,
    at least one tool carrier carried by the framework so as to be disposed on one side of the workpiece and drive means for effecting movement of the tool carrier in one direction towards the workpiece to effect a machining operation and in the opposite direction to withdraw the tool carrier from the workpiece, thrust member means carried by the framework so as to be disposed on the side of a workpiece opposite to the side on which the tool carrier is arranged said means being movable into engagement with the workpiece to support the same against the thrust of the tool during a machining operation, means for driving said elevator means to effect vertical movement of the workpiece to position the same for a machining operation, and means for providing a constant load on the elevator drive means to compensate for change of weight of the workpiece resulting from machining operations.

14. Apparatus as claimed in claim 13, wherein the machine foundation is a rigid structure comprising a vertically extending portion of channel section and two horizontally disposed portions one at each side of the open side of the channel and projecting outwardly therefrom, the elevator means being disposed in the channel, the tool carrier and thrust member being mounted on a respective one of the horizontally disposed portions.

15. Apparatus as claimed in claim 13, wherein a plurality of tool carriers are provided arranged side by side in spaced relationship, a corresponding number of thrust members also being provided and arranged side by side in spaced relationship, means for moving the tool carriers towards and away from each other to adjust the spacing between adjacent tool carriers and means for moving the thrust members towards and away from each other to adjust the spacing between adjacent thrust members.

16. Apparatus as claimed in claim 13, wherein each thrust member comprises a tube, a hydraulic ram connected to each said tube and means for supplying hydraulic liquid to each said hydraulic ram to move the thrust tubes into engagement with a workpiece.

17. Apparatus as claimed in claim 16 including means for hydraulically locking each ram to hold each thrust tube in contact with a workpiece.

18. Apparatus as claimed in claim 13, wherein the elevator means comprises vertically extending slides, a workpiece supporting platform carried by said slides so as to be vertically movable along the slides, means operable to effect the vertical movement of the platform said means comprising screw and nut mechanisms consisting of rotatably mounted vertically extending screws each carrying a nut secured to the platform, and drive means for effecting rotation of each screw said drive means comprising an electric motor and reduction gear.

19. Apparatus as claimed in claim 18 including means for providing a constant load on the elevator operating means to compensate for change of weight of the workpiece resulting from machining operations.

20. Apparatus as claimed in claim 19, wherein said compensating means comprise hydraulic actuators controlled by a hydraulic pressure controller which is in turn controlled electrically by a torque detector detecting the electric motor and reduction gear unit producing the vertical movement of the elevator, such detector outputting an electrical signal proportional to the torque to the controller so as to ensure that a constant load is applied to the elevator operating means.

21. Apparatus as claimed in claim 20, wherein the hydraulic actuators comprise hydraulic rams extending vertically parallel to the platform slides each said ram being fixed at its lower end and extending into a respective tube carried by the platform the upper end of each ram abutting the upper closed end of its respective tube.

22. Apparatus as claimed in claim 18, wherein the screws of the screw and nut mechanisms are jointly rotated in synchronism by a chain drive one of said screws being connected to so as to be driven by the motor and reduction gear.

23. Apparatus as claimed in claim 13, wherein the movements of the thrust members relatively to the tool carriers are synchronized by two screws interconnected by an endless chain running over two sprockets one for each screw and respectively driving a set of nuts rigidly secured to each movable member.

24. Apparatus as claimed in claim 13, wherein the machine foundation is made of reinforced concrete the channel section portion extending below ground level, the outwardly extending portions being disposed at or substantially at ground level.

25. Apparatus for machining a workpiece more particularly for drilling and boring plates or baffles for heat exchangers comprising:

a machine foundation in the form of a closed framework, elevator means carried by the framework for supporting a workpiece in a vertically upright position, means for driving said elevator means to effect vertical movement of the workpiece to position the same for a machining operation, means for providing a constant load on the elevator drive means to compensate for change of weight of the workpiece resulting from machining operations, at least one tool carrier and at least one thrust member carried by the framework, said tool carrier and thrust member being disposed opposite to one another so as to be one on either side of a workpiece positioned therebetween, drive means for the tool carrier for effecting movement of the tool carrier in a direction towards the workpiece for a machining operation and in the opposite direction to withdraw the tool carrier, drive means for the thrust member for effecting movement thereof in a direction towards a workpiece and into contact therewith to support the same against the thrust of the tool during a machining operation and in the opposite direction to withdraw the thrust member, and means for synchronizing the movements of the tool carrier and thrust member towards or away from a workpiece.

26. Apparatus as claimed in claim 25, wherein the machine foundation is a rigid structure comprising a vertically extending portion of channel section and two horizontally disposed portions one at each side of the open side of the channel and projecting outwardly therefrom, the elevator means being disposed in the channel, the tool carrier and thrust member being mounted on a respective one of the horizontally disposed portions.

27. Apparatus as claimed in claim 25, wherein a plurality of tool carriers are provided arranged side by side in spaced relationship, a corresponding number of thrust members aslo being provided and arranged side by side in spaced relationship, means for moving the tool carriers towards and away from each other to adjust the spacing between adjacent tool carriers and means for moving the thrust members towards and away from each other to adjust the spacing between adjacent thrust members.

28. Apparatus as claimed in claim 25, wherein each thrust member comprises a tube, a hydraulic ram connected to each said tube and means for supplying hydraulic liquid to each said hydraulic ram to move the thrust tubes into engagement with a workpiece.

29. Apparatus as claimed in claim 28 including means for hydraulically locking each ram to hold each thrust tube in contact with a workpiece.

30. Apparatus as claimed in claim 25 wherein the elevator means comprises vertically extending slides, a workpiece supporting platform carried by said slides so as to be vertically movable along the slides, means operable to effect the vertical movement of the platform said means comprising screw and nut mechanisms consisting of rotatably mounted vertically extending screws each carrying a nut secured to the platform, and drive means for effecting rotation of each screw said drive means comprising an electric motor and reduction gear.

31. Apparatus as claimed in claim 30 including means for providing a constant load on the elevator operating means to compensate for change of weight of the workpiece resulting from machining operations.

32. Apparatus as claimed in claim 31, wherein said compensating means comprise hydraulic actuators controlled by a hydraulic pressure controller which is in turn controlled electrically by a torque detector detecting the electric motor and reduction gear unit producing the vertical movement of the elevator, such detector outputting an electrical signal proportional to the torque to the controller so as to ensure that a constant load is applied to the elevator operating means.

33. Apparatus as claimed in claim 32, wherein the hydraulic actuators comprise hydraulic rams extending vertically parallel to the platform slides each said ram being fixed at its lower end and extending into a respective tube carried by the platform the upper end of each ram abutting the upper closed end of its respective tube.

34. Apparatus as claimed in claim 30, wherein the screws of the screw and nut mechanisms are jointly rotated in synchronism by a chain drive one of said screws being connected to so as to be driven by the motor and reduction gear.

35. Apparatus as claimed in claim 25, wherein the movements of the thrust members relatively to the tool carriers are synchronized by two screws interconnected by an endless chain running over two sprockets one for each screw and respectively driving a set of nuts rigidly secured to each movable member.

36. Apparatus as claimed in claim 25, wherein the machine foundation is made of reinforced concrete the channel section portion extending below ground level, the outwardly extending portions being disposed at or substantially at ground level.

* * * * *